April 26, 1932.  A. W. CAPS  1,855,789
CAMERA
Filed June 14, 1929   3 Sheets-Sheet 1

INVENTOR
Arthur W. Caps
BY
his ATTORNEYS

April 26, 1932. A. W. CAPS 1,855,789
CAMERA
Filed June 14, 1929 3 Sheets-Sheet 2

INVENTOR
Arthur W. Caps
BY
his ATTORNEYS

April 26, 1932. A. W. CAPS 1,855,789
CAMERA
Filed June 14, 1929 3 Sheets-Sheet 3

INVENTOR
Arthur W. Caps
BY
his ATTORNEYS

Patented Apr. 26, 1932

1,855,789

UNITED STATES PATENT OFFICE

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND

CAMERA

Application filed June 14, 1929. Serial No. 370,999.

The present invention relates especially to cameras of the type employing a roll or long strip of sensitized sheet material, successive portions of the roll being unwound and drawn into the exposure area of the focal plane, so that exposures may be made. In the constructions heretofore known, the sensitized material frequently bulges away from its correct position and accordingly does not lie accurately in the focal plane of the camera. The object of the present invention is to provide an improved construction which prevents bulging of the sensitized material and which holds the material accurately in the focal plane.

To these and other ends the invention resides in certain improvements and combinations of parts, all as will be hereinafter more fully described the novel features being pointed out in the claims at the end of this specification.

In the drawings.

Similar reference numerals throughout the several views indicate the same parts.

Figure 1:
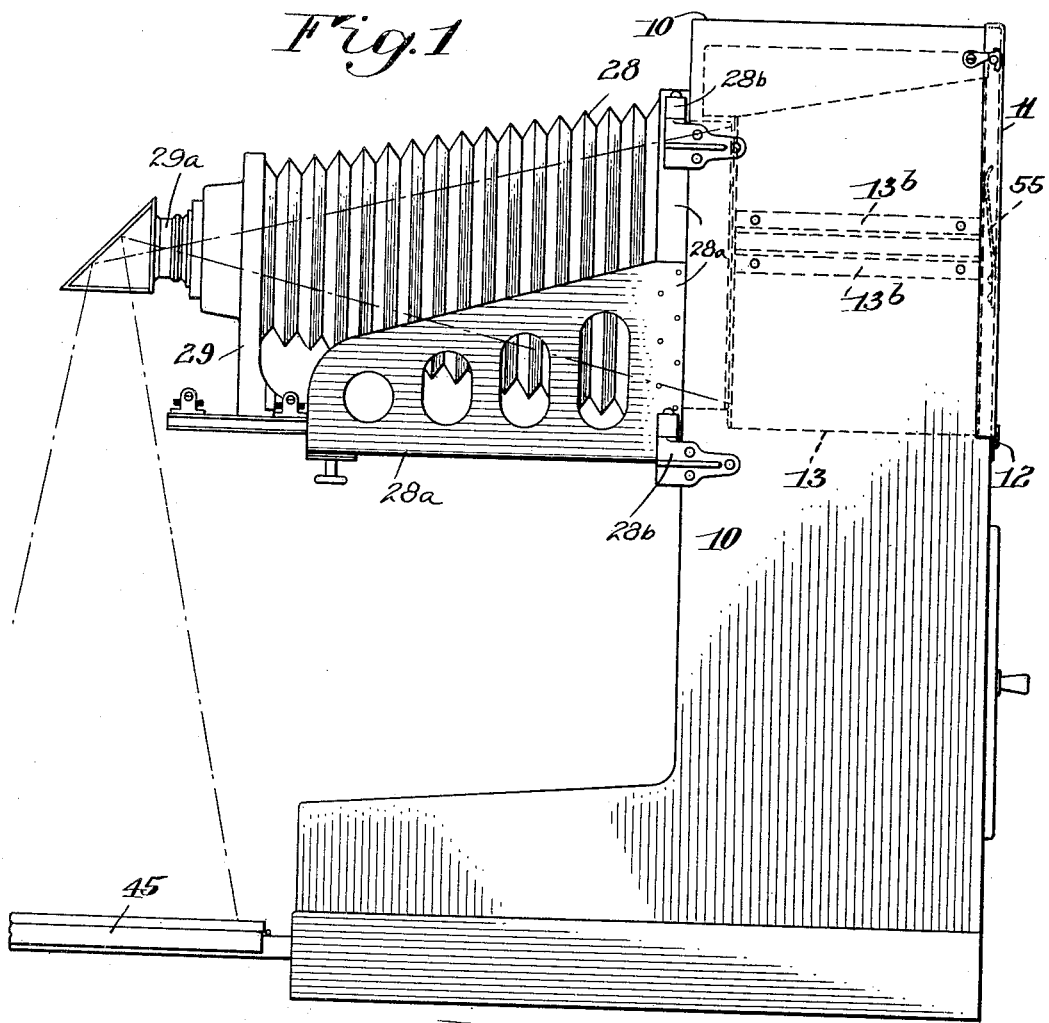
Fig. 1 is a side elevation of a camera constructed in accordance with a preferred embodiment of the invention.
Figure 3:
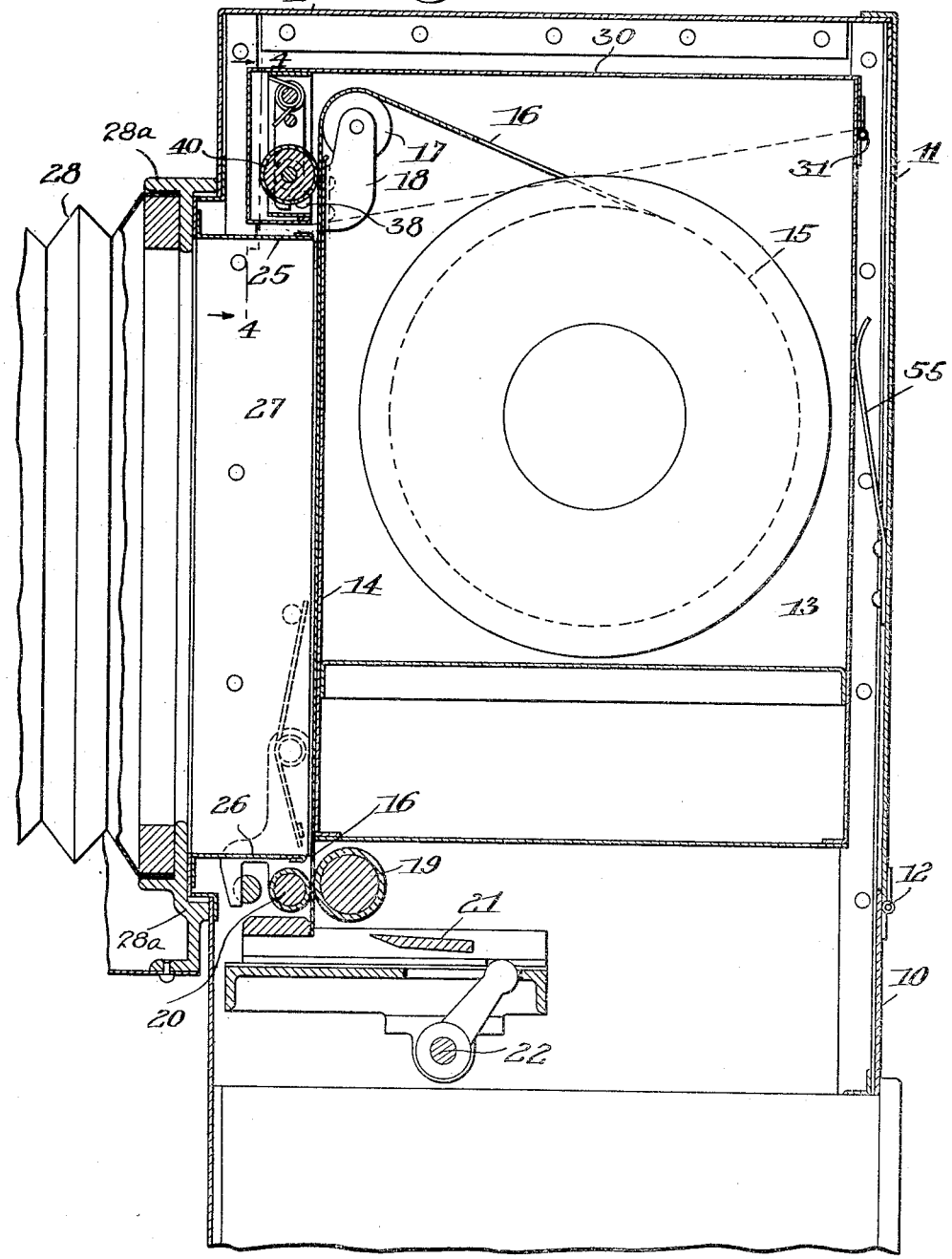
Fig. 3 is a vertical section taken substantially through the center of a portion of the camera.
Figure 4:
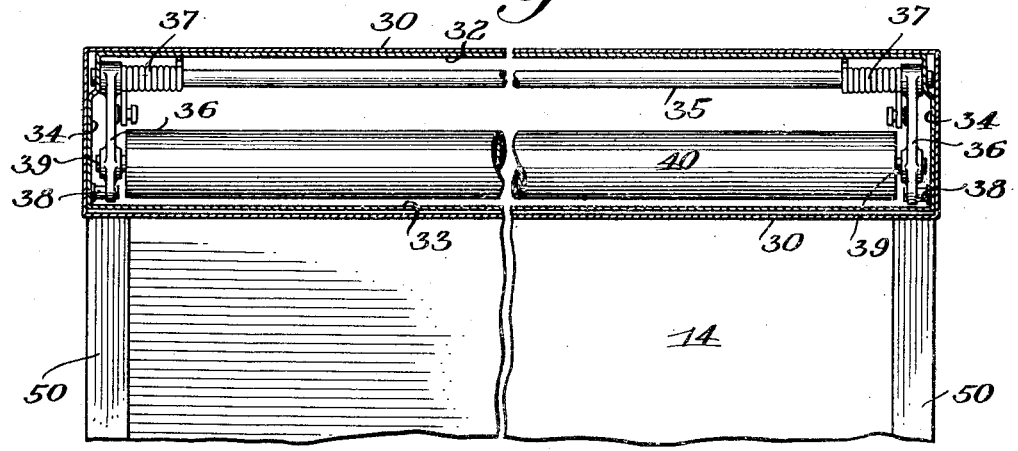
Fig. 4 is a fragmentary transverse vertical section taken substantially on the line 4—4 of Fig. 3.
Figure 5:
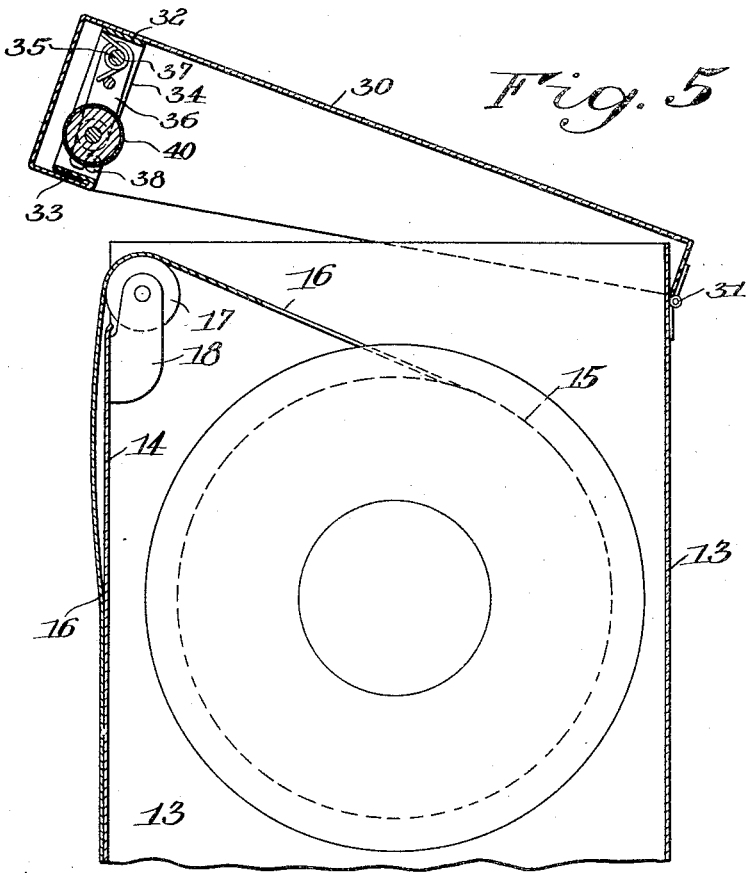
Fig. 5 is a vertical section through a portion of the roll box showing the cover or closure member partially opened.

Referring now to Figs. 1 and 3 of the drawings, there is shown a portion of a camera having a body 10 and a back door 11 hinged at 12 to the body, this door when open providing an aperture for insertion or removal of a roll box indicated generally by the numeral 13, this roll box having a front wall 14 which preferably constitutes a focal plane support for holding the sensitized material in the focal plane of the camera. The ends of the roll box carry horizontal rails 13a which slide in guideways formed by the angle bars 13b fixed on the inner sides of the side walls of the casing 10.

The sensitized material is preferably in the form of a roll 15 supported for rotation within the body of the roll box 13. In use, the sensitized material from the roll is moved along a path 16 which is led over and makes a bend around guiding means such as the roller 17 mounted in brackets 18 near the upper front edge of the roll box, the sensitized material thence extending downwardly along the front or exterior surface of the front wall 14 of the roll box, and passing between feeding rolls 19 and 20 so that rotation of these rolls will draw the sheet material along, unwinding fresh portions thereof from the roll 15 and positioning such portions in the exposure area of the focal plane. The exposed portions, after being fed downwardly to a position below the feeding rolls 19 and 20, are severed from the rest of the strip by a severing knife 21 reciprocated by arms on a rock shaft 22. The severed and exposed prints may then be developed and fixed or otherwise treated in any suitable manner.

The maximum exposure area is defined by a mask formed by the top and bottom flanges 25 and 26 and by corresponding lateral flanges 27. It will be noted from Fig. 3 that the focal plane support 14 extends in one direction considerably beyond the edge of the exposure area, that is, the upper edge of the member 14 is considerably above the upper flange 25 defining the top of the exposure area. The sensitized material is so wound on the roll 15 that when it is unwound and drawn over the support 14, the uncoated side of the material will be rearwardly or against the support 14, while the coated or emulsion side of the material will be forwardly in position to receive light rays coming thereto through the camera bellows 28 which connect the camera body to any suitable form of lens and shutter mechanism 29a mounted on the camera front 29.

Figure 2:
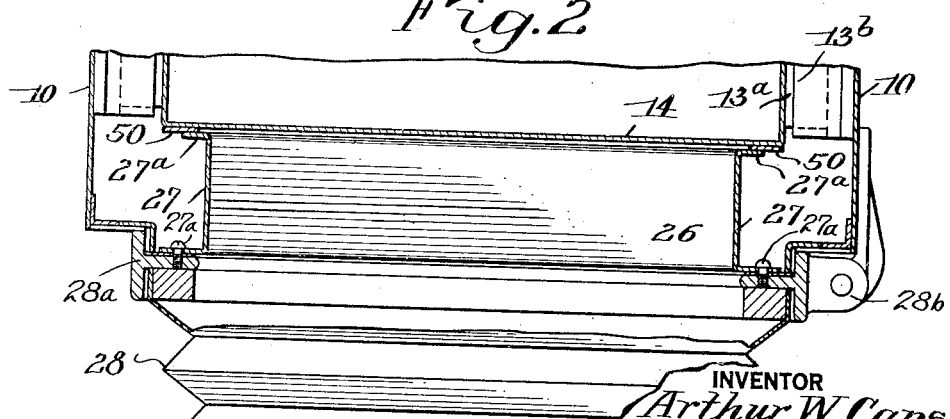
Fig. 2 is a horizontal section through a portion of the camera, illustrating the focal plane support and the mask which holds the edges of the sensitized material accurately in the focal plane.

The camera bellows 28 and front 29 are both attached to a frame 28a which is pivotally connected to the camera body 10 as by hinges 28b, shown in Figs. 1 and 2. At the opposite edge of the frame 28a from the hinges there is any suitable catch for holding the frame in the normal position shown in the drawings. When the catch is released, the frame 28a, and with it the bellows 28 and front 29, may be swung on the hinges 28b so that the frame and bellows no longer cover the opening in the front wall of the camera body through which light travels toward the focal plane when marking an exposure, but allow free access through this opening to the interior of the body from the front side of the focal plane. This permits easy threading of the sensitized strip 16 between the feed rolls 19 and 20, and also allows parts within the camera body to be assembled or repaired most conveniently, since access to the interior of the body may be obtained both through the front opening when the bellows is swung aside and through the rear opening when the rear door 11 is opened.

As shown especially in Fig. 2, the mask 25—26—27 is attached to the hinged frame 28a as by screws 27a, so that the mask swings out through the front opening when the frame and bellows are swung on their hinges to uncover the front opening, and swings back into place when the parts are moved back again to close the front opening. The bellows 28 may be said to form an extension of the camera body through which light rays pass in travelling from the lens means 29a to the focal plane, this extension being shiftable to provide access to the front of the focal plane.

The rear edges of the side flanges 27 of the mask are turned outwardly as shown at 27a in Fig. 2. The rear surfaces of these outturned edges 27a define the focal plane of the camera. The rear edges of the top and bottom flanges 25 and 26 lie in this focal plane defined by the rear surfaces of the flanges 27a, and thus assist in preventing the sensitized material at the top and bottom of the exposure area from bulging forwardly from the support 14. As explained hereafter, however, the space between the support 14 and the rear edges of the flanges 25 and 26 is slightly greater than the thickness of the sensitized material, so that the material is not pressed tightly against the flanges 25 and 26 and accordingly the emulsion is not scratched or otherwise marred by the flanges.

In assembling the camera at the factory, a ground glass plate or similar device is placed against the rear surfaces of the flanges 27a (the door 11 being opened) and the camera front 29 is adjusted back and forth until the image of an object placed on the copyholder 45 is properly focused on the glass plate. The stops or other elements which control the motion of the camera front 29 are then set or locked in proper position so that whenever the camera front is brought to the point defined by such stops, the image of any article on the copyholder will be properly focused exactly in the plane of the rear surfaces of the outturned flanges 27a. Once this setting has been made, the glass plate may be taken away, and the operation need not be repeated.

In the practical use of the camera, then, the problem is to make the sensitized sheet material 16 lie accurately in the plane defined by the rear surfaces of the flanges 27a, since this plane is the focal plane of the camera. To assist the sensitized material to lie in this plane, the strip of material is made slightly wider than the distance between the side flanges 27 of the mask, so that the extreme lateral edges of the sensitized material will slightly overlap the mask and contact with the rear surfaces of the outturned flanges 27a.

Two vertical strips 50 are provided on the front wall 14 of the roll box, these strips being at the extreme ends of this front wall in the position best illustrated in Fig. 2. The clear distance between these strips is slightly greater than the width of the strip of sensitized material 16, so that the material may fit between these strips and lie along the front wall 14 of the box, the strips 50 serving somewhat as a guide to prevent lateral displacement or twisting of the sensitized material. The strips come into contact with the flanges 27a when the roll box is placed in position in the camera, as illustrated in Fig. 2, and thus serve to limit the forward motion of the box and to hold it in exactly the desired position.

The thickness of the strips 50 is very slightly greater than the thickness of the sensitized material which is to be used in the camera, so that the channel between the wall 14 and the flange 27a is slightly thicker than the thickness of the sensitized material, thus allowing the material to be fed easily without binding. For example, the strips 50 may be one-sixteenth inch thick, where the sensitized material is in the form of paper or card stock. When the roll box 13 has been loaded with a roll of sensitized material and when this material has been led over the roller 17 and down the front 14 of the box, the roll box is then inserted through the door at the rear of the camera body so that the rails 13a on the box fit in the guideways 13b, and the box is shoved within the camera as far as it will go, the door 11 then being closed and the spring 55 on the inner surface of this door pressing against the back of the roll box and tending to keep the box in its forward position.

When thus urged forwardly by the spring 55, the vertical strips 50 on the front wall 14 of the roll box come into contact with the outturned flanges 27a on the mask in the manner clearly illustrated in Fig. 2, as above stated. The flanges of the mask thus form stop members determining the position of the roll box and accordingly the position of the front wall 14 thereof which constitutes the focal plane support. Accordingly, the front surface of the wall 14 will be positioned rearwardly of the true focal plane or the rear surfaces of the flanges 27a by an amount equal to the thickness of the strips 50. Hence the front or emulsion surface of the sensitized material, when the material is lying against the front surface of the wall 14, will be substantially in the focal plane, since the thickness of the strips 50 is only slightly greater than the thickness of the sensitized material. The difference between the thickness of the sensitized material and the thickness of the strips 50 is so slight in relation to the comparatively long focal length of the lens employed that the displacement of the emulsion coating from the true focal plane by an amount equal to this difference in thickness is entirely negligible so far as sharp focusing of the image on the sensitized material is concerned. Therefore, so long as the sensitized material is lying flat against the front surface of the wall 14, the emulsion surface on the material will be accurately in the focal plane from a practical standpoint, and clear and sharp prints will be produced. Hence, to obtain sharp and satisfactory prints, the principal problem is to keep the sensitized material lying flat and substantially tight against the support 14, and to prevent it from bulging away from this support to a sufficient extent to effect adversely the sharpness of focusing.

This keeping of the sensitized material in proper position is accomplished in part by the flanges 27a of the mask, which, it will be remembered, contact with the extreme edges of the strip of material and hold these edges against the wall 14, preventing them from curling up although permitting the strip to be drawn downwardly by operation of the feeding rolls 19 and 20 when desired. Thus, the side edges of the sensitized material are held in place, and this tends more or less to hold the central expanse of material in the focal plane.

Holding the material at its lateral edges alone is not entirely effective to keep it smooth or flat in the focal plane, however, since there is a tendency of the material to curl partly because of the permanent set imparted to it by remaining rolled for a considerable time on the roll 15, and partly by reason of the bend which it makes around the roller 17, the natural resiliency of the material tending to cause it to bulge out just below this bend around the roller 17. This tendency to curl and bulge is especially pronounced when comparatively thick sheet material is used, such as card stock. Means is provided, however, for overcoming both of these tendencies and for causing the sensitized material to lie flat accurately in the focal plane notwithstanding the bend around the roller 17 and notwithstanding the set which the material may have obtained by being wound on the roll 15.

The novel means provided for keeping the sensitized material accurately in the focal plane even when heavy card stock is used is as follows: The roll box 13 has a cover or closure member 30 hinged to the box body at 31. This cover 30 has a deep overhanging front edge in which is placed a somewhat rectangular frame comprising a top bar 32, a bottom bar 33, and end bars 34. Extending along the frame and mounted on the end members 34 thereof is a shaft 35 which carries arms 36 pivoted on the shaft near the ends thereof. Springs 37 coiled around the shaft 35 tend to move the lower ends of the arms 36 rearwardly, such motion being limited by contact of the arms with stop pins 38. In these arms 36, near the lower ends thereof, are journaled trunnions 39 of a roller 40 covered with felt or other suitable material. The roller and other parts just described are all positioned within the overhang of the cover of the roll box, so that when the cover is closed to the normal position indicated in Fig. 1, the springs 37 will tend to move the roller 40 resiliently rearwardly against the upper portion of the focal plane support 14. In constructing the mechanism, the shaft 35, roller 40, and associated parts may all be conveniently assembled in the frame comprising the members 32, 33, and 34, and this frame with its assembled parts may then be inserted as a unit in the overhanging portion of the cover 30.

The action of the roller 40 in overcoming the curling or bulging of the sensitized material may be described as two-fold. In the first place, the roller contacts with the sensitized material at a point between the upper edge of the exposure area and the upper edge of the focal plane support 14, and thus holds the material against the support at this point. Since this point is beyond the point where the material bends around the roller 17, it follows that the roller 40 completely neutralizes the tendency of the material to straighten out at this bend and keeps the material within the exposure area below the roller 40 from having any tendency to bulge on account of the bend around the roller 17.

The second action of the roller 40 is in creating a pronounced frictional drag on the sensitized material which enables the feeding rolls 19 and 20 to place the material under considerable tension in the focal plane, which tension, of course, overcomes the tendency to curl or bulge and assists in holding the material accurately in the plane. The focal plane support 14 is movable in the sense that it together with the entire roll box 13 may be removed from the camera, but the support when placed in its normal position within the camera may be considered a stationary member in distinction to the movement of the sensitized material when it is being fed. The upper portion of the member 14 thus constitutes a stationary member against which the sensitized material is resiliently pressed by the roller 40. Obviously, the pressure of the sensitized material against this stationary member will cause frictional resistance to the movement of the sensitized material when an attempt is made to draw it over the stationary member by rotating the feed rolls 19 and 20.

It should be noted here that it is only the back of the sensitized material which comes in contact with any stationary member, and any scratching of the back of the material is of no consequence. The front or emulsion side of the material simply contacts with the rollers 40 and 20, which turn when the material moves, so that no scratching of the emulsion can occur.

The pressure of the roller 40 against the sensitized material may be varied by varying the strength of the springs 37, and thus the amount of the frictional drag or resistance to movement caused by the roller 40 may be varied to suit the particular characteristics of the sheet material being used. The strength of the springs 37 will be so chosen in use as to produce a drag sufficient so that the resulting tension on the portion of the sheet material between the roller 40 and the feed rolls 19 and 20 will effectively overcome any tendency of the sheet material to curl or bulge on account of its having been rolled on the roll 15.

To sum up the two-fold action of the roller 40, it may be said that the frictional drag produced by the roller pressing the sheet material against a stationary member permits the feeding rolls to place the material under tension which overcomes the tendency of the material to curl or bulge forwardly out of the true focal plane because of its having been wound on the roll 15, while the position of the roller 40 beyond the roller 17 neutralizes or overcomes the tendency of the sheet material to straighten out at the bend around the roller 17 and thus to cause bulging at the upper part of the exposure area.

Since the roller 40 holds the sheet material accurately in the focal plane above the exposure area, the rolls 19 and 20 hold it in the plane below the exposure area, and the flanges 27a hold the lateral edges of the material in the focal plane at the sides of the exposure area, it follows that the sensitized material is held accurately in the true focal plane at all four sides of the exposure area. Furthermore, although the central expanse of material is not directly and positively held in the focal plane, the tension on the material prevents it from curling and makes it lie in the same plane as the four sides which are positively held. Thus exceptionally good results are obtained, and the photographic prints produced on a camera constructed in accordance with this invention are accurately focused and of excellent character.

When the sheet material on the roll 15 has been exhausted by repeated exposures and feeding actions, the roll box may be removed from the camera body by opening the door 11, the closure 30 of the box may be thrown back, and a fresh roll of sensitized material may be placed in the box. The end of this roll is then drawn over the roller 17, the closure 30 is closed or put in its normal position so that the roller 40 presses against the sheet material, and the box is replaced in the camera body, the end of the strip of sensitized material being threaded between the feeding rolls 19 and 20.

While one embodiment of the invention has been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. A roll box for a camera comprising, in combination, a box body for containing a roll of sensitized material, a movable closure for said body, said sensitized material being arranged to be drawn between said body and said closure and thence along the outside of one wall of said body, and roller means resiliently mounted on said closure for contacting with the sensitized material when the closure is in one position, to press said material against said wall of the body to assist it in lying smoothly along said wall.

2. A roll box for a camera comprising, in combination, a box body for containing a roll of sensitized material, a movable closure for said body, an arm pivotally mounted on said closure, roller means rotatably mounted on said arm, and resilient means tending to shift said arm to cause said roller means to contact with a portion of said box body when said closure is in normal closed position.

3. In a camera for the use with sheet material having a sensitized coating on one surface thereof, the combination with a stationary member, of means for drawing said sheet material over said stationary member and into the focal plane, with the uncoated side of said sheet material in contact with said stationary member, and roller means contacting resiliently with the sensitized side of said sheet material for pressing said material against said stationary member to create a frictional drag on the material for tensioning it to cause it to lie flat in the focal plane.

4. In a camera, the combination with a focal plane having a substantially rectangular exposure area, of means for positively holding sheet material accurately in the focal plane along substantially all four sides of said exposure area, said means being out of direct contact with the central expanse of sheet material in the exposure area, means for feeding successive portions of sheet material to said exposure area for exposure, and mechanism for severing exposed portions of sheet material from unexposed portions thereof.

5. In a camera, the combination with a movable focal plane support arranged to have sheet material placed thereon, of pivoted stop means for determining the position of said focal plane support, said stop means having a portion contacting with a portion of the sheet material on the support to assist in holding the sheet material flat against the support when the stop means is in one position, and being movable to another position providing relatively unobstructed access to sheet material on the front of said focal plane support.

6. In a camera, the combination with a movable focal plane support arranged to have sheet material moved across it in one direction, of means adjacent the edges of the path of travel of the sheet material for guiding the sheet material and preventing displacement thereof laterally, and stop means movable from a normal position contacting with said guiding means for determining the position of said movable focal plane support to another position providing relatively unobstructed access to the front of said focal plane support.

7. In a camera, the combination with a movable focal plane support arranged to have sheet material moved across it in one direction, of means adjacent the edges of the path of travel of the sheet material for guiding the sheet material and preventing displacement thereof laterally, and stop means pivotally mounted for oscillation from a normal position contacting with said guiding means for determining the position of said movable focal plane support to another position providing relatively unobstructed access to the front of said focal plane support, said stop means extending inwardly of said guiding means in position to overlie and contact with a portion of the sheet material to assist in holding it flat against the focal plane support.

8. In a photographic apparatus, the combination with a camera body, of a focal plane support within said body, means comprising a mask for holding sensitized material against said focal plane support, and a pivotal connection between said mask and said body so that said mask may be shifted relative to said body to provide unobstructed access to the front of said focal plane support.

9. In a photographic apparatus, the combination with a camera body, of a focal plane support within said body, said body having an opening in front of said focal plane support, an extension normally covering said opening and projecting from said body, means for admitting light to said extension to pass therethrough and through said opening to make an exposure, a pivotal connection between said extension and said body so that said extension may be swung relative to said body to uncover said opening, and means carried by said extension and swinging therewith for contacting with sensitized material to hold it against said focal plane support.

10. In a photographic apparatus, the combination with a camera body, of a focal plane support within said body, said body having an opening in front of said focal plane support, an extension normally covering said opening and projecting from said body, means for admitting light to said extension to pass therethrough and through said opening to make an exposure, a pivotal connection between said extension and said body so that said extension may be swung relative to said body to uncover said opening, and focal plane defining means carried by said extension and swinging therewith, said defining means when in normal position determining the location of said focal plane support.

ARTHUR W. CAPS.